United States Patent [19]

Gardner et al.

[11] 4,207,943
[45] Jun. 17, 1980

[54] COUNTERCURRENT SOLID-TO-SOLID HEAT TRANSFER APPARATUS AND METHOD

[75] Inventors: James H. Gardner; Noel H. de Nevers, both of Salt Lake City, Utah

[73] Assignee: Oros Company, Salt Lake City, Utah

[21] Appl. No.: 24,669

[22] Filed: Mar. 28, 1979

[51] Int. Cl.² .............................................. F28C 3/10
[52] U.S. Cl. ......................................... 165/1; 165/84; 165/111; 209/285; 366/187; 432/118
[58] Field of Search .................... 165/111, 88, 84, 1; 432/118, 110; 366/147, 187, 220, 225, 226, 228; 209/284, 285, 287, 293, 294, 299, 238

[56] References Cited

U.S. PATENT DOCUMENTS

| | | | |
|---|---|---|---|
| 2,310,603 | 2/1943 | Taylor | 366/226 X |
| 2,592,783 | 4/1952 | Aspegren | 165/88 X |
| 4,038,021 | 7/1977 | Benson | 432/118 X |
| 4,127,388 | 11/1978 | Maczko et al. | 432/118 X |

FOREIGN PATENT DOCUMENTS

| | | | |
|---|---|---|---|
| 738732 | 3/1970 | Belgium | 165/111 |
| 682988 | 10/1939 | Fed. Rep. of Germany | 432/118 |
| 1203286 | 8/1970 | United Kingdom | 165/111 |

*Primary Examiner*—Sheldon Richter
*Attorney, Agent, or Firm*—Thorpe, North & Gold

[57] ABSTRACT

Apparatus for transferring heat between solid particles includes a rotatable cylindrical drum which includes plates mounted on the interior surface of the drum wall to extend inwardly thereof. Also included is an elongate vibratory screen disposed within the drum but supported independently of the drum. The screen includes a plurality of apertures of generally uniform size and is inclined with respect to the horizontal. A plurality of vanes are located underneath the screen to guide material falling from the screen toward one end of the drum. A feed bin is provided to introduce a first granular material onto the screen near said one end of the drum, with the particles of such granular material generally being of a size greater than the size of the apertures in the screen. A second feed bin is provided to introduce a second granular material into the other end of the drum, with the particle size of the second granular material generally being less than the size of the apertures. When the drum is rotated, the second granular material is carried from the bottom of the drum toward the top thereof where it then falls from the blades onto the screen. As the screen is vibrated, the first granular material is caused to move downwardly on the screen and the second material is caused to sift through the apertures in the screen to be carried by the blades back up onto the screen. In this manner, the first and second materials are placed in contact with one another to enable transfer of heat therebetween.

14 Claims, 6 Drawing Figures

COUNTERCURRENT SOLID-TO-SOLID HEAT TRANSFER APPARATUS AND METHOD

BACKGROUND OF THE INVENTION

This invention relates to a method and apparatus for counterflow heat exchange between solids in which the solids are brought into contact with one another to facilitate the heat exchange.

A common and recurring industrial need is that of transferring heat to or removing heat from materials for the purpose of, for example, preparing such materials for processing operations which are to be carried out at certain temperatures. After the processing, it is oftentimes desirable to bring the temperature of the material back to its previous temperature for storage, packaging, etc.

Heat transfer or exchange between fluids is oftentimes accomplished by the well known process of placing two fluids of differing temperature in as close proximity as possible with each other. One of the simplest ways of doing this is to place a small pipe inside a larger pipe and then apply one fluid to the small pipe and the other fluid to the larger pipe (outside the smaller pipe). If the two fluids are applied to the pipe so that they both flow in the same direction (parallel flow), then the temperatures of the two fluids tend toward the average therebetween. If the fluids are applied to the pipes to flow in opposite directions (counterflow), then the temperature of each fluid tends toward the other fluid's entering temperature.

There have been a number of suggestions for providing a heat exchange between solid materials including those disclosed in U.S. Pat. Nos. 2,592,783 and 4,038,021 and in copending patent application, Ser. No. 943,057. In the first mentioned patent, heated or cooled balls are brought into direct contact with a material to be either heated or cooled inside a rotating drum. The balls are piled up in one end of the rotating drum and the material in the other end and the rotation of the drum tends to move the balls and material towards one another in a type of counterflow operation to somehow mix so that heat can be exchanged between the balls and the material.

The structure disclosed in the second mentioned patent includes an inclined tubular casing and an auger disposed within the casing, with the flights of the auger being perforated. A granular product to be dried and heat conducting particles such as salt, are discharged into the casing from an opening in the bottom end of a tubular shaft of the auger. As the auger is rotated, the granular product and heat conducting particles are in some manner intermixed, with the granular product being forced upwardly in the casing since the product is of a size too large to pass through the holes in the auger flights, and the heat conducting particles apparently staying near the bottom of the casing since the particles are small enough to pass through the holes in the auger flights. This arrangement, of course, does not provide for a counterflow operation but rather provides for a type of mixing of two different size particles and then the removal of one size from the mixture.

In the above-mentioned patent application, a countercurrent heat transfer device is shown to include an inclined, rotatable, cylindrical drum in which is disposed a helical auger whose outer lip is maintained in contact with the interior wall of the drum. The auger includes a plurality of openings so that when a fine material is introduced into the upper end of the drum and a coarse material is introduced into the lower end of the drum, and the drum is rotated, the fine material sifts through the auger and the coarse material is carried by the auger to the upper end of the drum. In this manner, the coarse and fine material contact one another to exchange heat.

SUMMARY OF THE INVENTION

It is an object of the present invention to provide a new and improved method and apparatus for enabling exchange of heat between solids.

It is another object of the invention to provide an efficient apparatus and method for enabling exchange of heat between solid particles in a type of counterflow operation.

It is a further object of the invention to provide such a method and apparatus in which effective use of gravity is utilized to facilitate the counterflow operation.

It is still another object of the invention to provide such a method and apparatus in which the rate of movement of one material relative to another may be readily varied.

The above and other objects of the invention are realized in a specific illustrative embodiment thereof which includes a generally cylindrical drum rotatable about its cylindrical axis; and carrying structure mounted in the drum for carrying material from the bottom of the drum to the top thereof as the drum is rotated, with such material falling from the structure as it nears the top of the drum. An elongate trough is disposed within the drum to extend from near one end of the drum downwardly in the drum at an angle with respect to the horizontal to near the other end of the drum. The trough has a plurality of openings in the bottom wall thereof. Vanes positioned under the trough guide material falling through the trough openings toward said one end of the drum. Also included is a bin or other guide structure for introducing a first granular material onto the trough near said one end of the drum, another guide structure for introducing a second granular material into the other end of the drum, and apparatus for causing the trough to vibrate and the drum to rotate. The first granular material is of a size generally larger than the openings in the trough whereas the second granular material is of a size generally smaller than the size of the openings. When the drum is rotated, the carrying structure carries the second granular material toward the top of the drum where it then falls onto the trough. As the trough is agitated, the first granular material is caused to move downwardly on the trough, while the second granular material is caused to sift through the openings in the trough and then is guided by the vanes toward said one end of the drum. In this manner, the first and second granular materials are placed in contact with each other to allow a heat exchange to occur between the materials.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1:
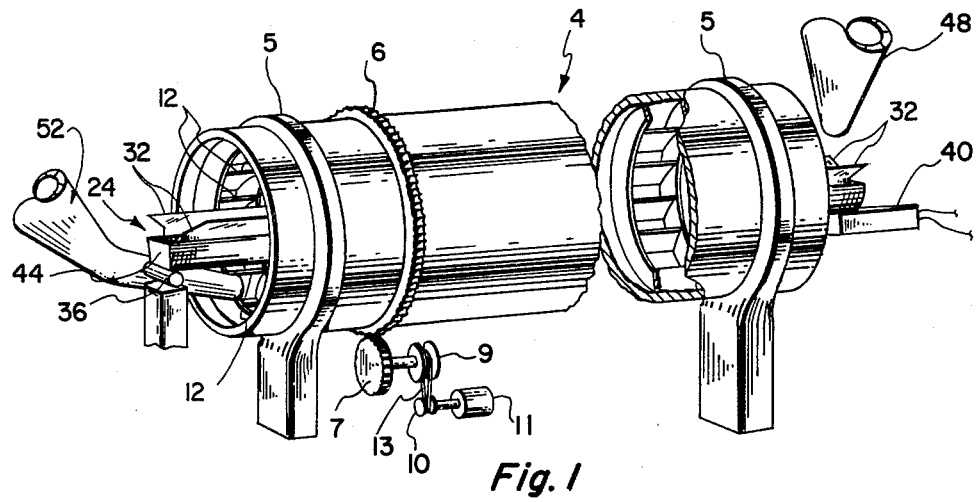
FIG. 1 is a perspective, partially cut away view of apparatus made in accordance with the present invention.
Figure 2:
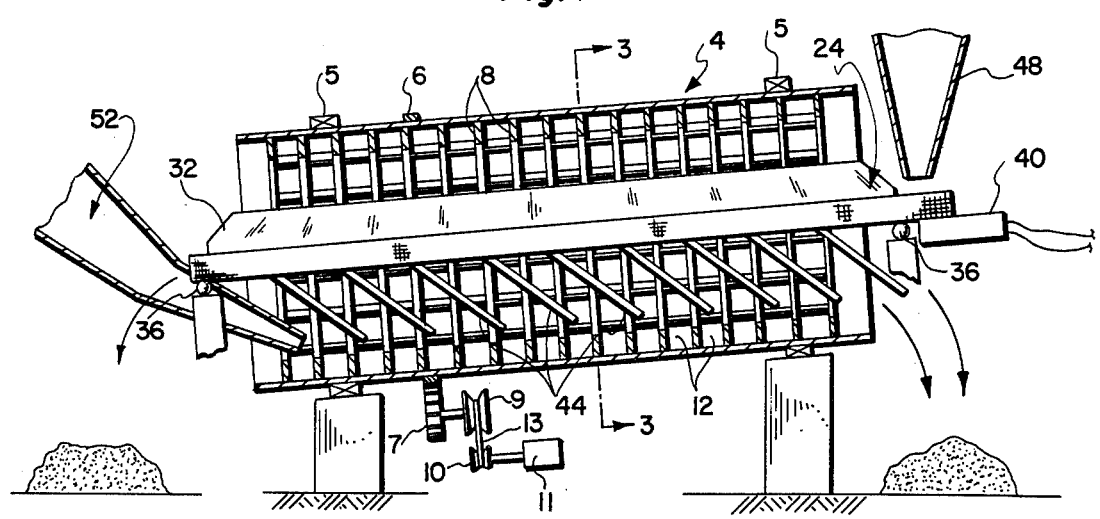
FIG. 2 is a side elevational, partially cross-sectional view of the apparatus of FIG. 1.
Figure 3:
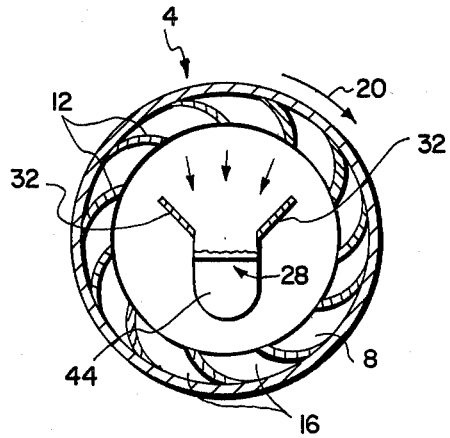
FIG. 3 is a cross-sectional, end view of the apparatus of FIG. 1.

Referring to FIGS. 1–3, there is shown a hollow tube or drum 4 inclined at an angle with respect to the horizontal. The drum 4 is open at either end thereof as indicated in the drawings.

The drum 4 is mounted to rotate within bearings 5 which could be affixed to a variety of well known support structures. Circumferentially mounted on the exterior wall of the drum 4 is a driven gear wheel 6. A drive gear wheel 7 is placed in driving contact with the gear 5 as shown and a pulley 9 is axially coupled to the drive gear wheel. Another pulley 10 is mounted on the drive shaft of a motor 11 and the pulleys 9 and 10 are coupled together by a belt 13. Operation of the motor 11 causes rotation of the pulley 10 which, in turn, causes rotation of the pulley 9. When the pulley 9 is rotated, the drive gear 7 is rotated to drive the driven gear wheel 6 to thereby cause the drum 4 to rotate. It should be understood that a variety of arrangements could be provided for causing rotation of the drum 4 and the particular arrangement shown in the drawings is only for purposes of illustration.

Disposed within the drum are a plurality of annular plates 8 attached at their perimeters to the inside wall of the drum and arranged in a spaced apart side-by-side relation along the length of the drum. The planes defined by the plates 8 are generally perpendicular to the cylindrical axis of the drum 4.

Disposed between each pair of adjacent plates 8 are a plurality of blades 12 which extend from the wall of the drum 4 generally inwardly as best seen in FIG. 3. The blades 12 are positioned between the plates 8 to form pockets 16 in which material may be carried from the bottom of the drum upwardly as the drum is rotated (in the direction indicated by the arrow 20 of FIG. 3) to a point where the material will fall from the pockets. Arranging the blades 12 at an angle with respect to the radii of the drum 4 (again as shown in FIG. 3) facilitates this. It should be understood that a variety of other carrying structure, pockets or buckets could be used with the drum 4 to carry material from the bottom of the drum to then release the material when it is near the top of the drum.

Disposed in the drum 4, also at an angle with respect to the horizontal, is an elongate trough 24 which extends the entire length of the drum and out either end as best seen in FIG. 2. The trough 24 includes a bottom wall 28 formed with a plurality of apertures therein, and side walls 32 which extend upwardly from the bottom wall 28 and then flare outwardly as best seen in FIG. 3. The trough is mounted to vibrate on rollers 36 positioned near either end of the trough. A conventional vibrator 40 is mounted to the trough 24 to cause vibration in the longitudinal direction. The reason for this vibration will be discussed momentarily.

Disposed underneath the trough 24 are a plurality of chutes or vanes 44 which project downwardly from the underneath side of the bottom wall 28 of the trough and toward the upper end of the drum 4. The vanes 44 are shown as being attached to the bottom of the trough but they could be suspended independently thereof so as not to vibrate as the trough vibrates. The vanes 44 are positioned to intercept material falling through the apertures in the bottom wall 28 of the trough and to guide the material toward the upper end of the drum.

Mounted near the upper end of the drum 4 and above the trough 24 is a feed bin 48. The lower end of the bin 40 is positioned so that material introduced into the bin is fed into the trough 24. As will be explained momentarily, a first granular material will be fed through the bin 40 into the trough 24.

Another bin 52 is positioned near the lower end of the drum 4 to feed another granular material into the drum. The lower end of the bin 52 extends into the lower end of the drum 4 within the plates 8. Thus, a second granular material supplied to the bin 52 will be deposited at a location within the drum 4 where the annular plates 8 will prevent it from flowing out of the drum.

As indicated earlier, the bottom wall 28 of the trough includes perforations or openings which are generally of a certain uniform size. The perforations are provided to allow sifting therethrough of the second granular material introduced through the bin 52 into the drum 4. To accomplish this, the size of the perforations must be greater than the size of the second granular material. The bottom wall 28 could be a screen, plate with holes formed therein etc. Also, the trough 24 could simply be a screen or plate with holes, etc., and use of the term "trough" is intended to mean trough, screen, perforated plate or the like.

In operation, a first granular material having a certain temperature and having particles of a size generally larger than the size of the perforations in the trough 24 is introduced into the bin 48 and thus onto the trough. A second granular material having a temperature different from the temperature of the first granular material and having particles of a size generally smaller than the size of the trough perforations is introduced into the bin 52 and thus into the drum 4. The drum is then rotated so that the blades 12 carry the second granular material upwardly for depositing on the trough 24. The trough 24 is vibrated or agitated to cause the first granular material to move downwardly along the trough, while the second granular material which falls onto the trough from the blades 12 is caused to sift through the perforations. The second granular material then falls onto the vanes 44 and slides thereover toward the upper end of the drum 4 to again be carried upwardly by the blades 12. Eventually the first and second granular materials come in contact with one another in the trough 24 to mix and then move past each other in a type of counter flow operation—with the first granular material moving downwardly along the trough and the second granular material moving through the trough. Since the materials are then repeatedly in contact, exchange of heat takes place between the materials. The first material ultimately flows down the trough 24 and out the lower end thereof whereas the second material is carried upwardly and out the upper end of the drum 4.

It may be desirable to introduce the second material (finer material) further into the drum 4 than shown in FIG. 2 to reduce the possibility of the material being carried out the bottom end of the trough 24 with the first material. Provision for doing this could include disposition of a helix having solid blades and attached to the interior wall of the drum at the lower end thereof in place of some of the plates 8. Thus, when the second material were introduced into the drum, the helical blades would cause the material to move upwardly in the drum a certain distance and onto plates 8 and blades 12. Another arrangement would simply be provision of a bin 52 having a longer discharge end which would extend some distance into the drum above the trough 24. The material would then be deposited on the trough to filter therethrough and be moved up some additional distance by the vanes 44, after which it would be carried out by the blades 12 to begin the mixing operation.

Figure 4:
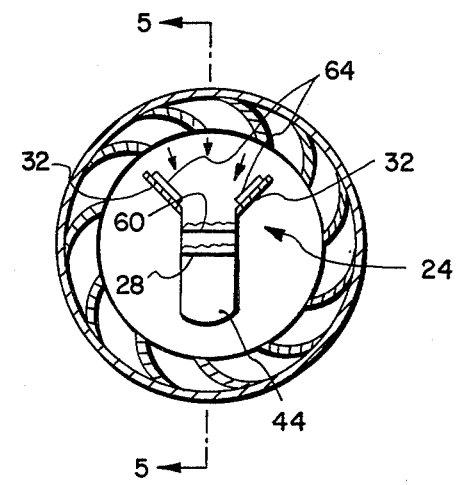
FIG. 4 is a cross-sectional end view of another embodiment of the present invention.

To achieve good heat transfer between the granular materials it is advantageous to distribute the finer granular materials evenly on the bottom wall of the trough 24. The reason for this is obvious—this being to increase the liklihood of contact between the finer granular material and the first or coarser granular material. Placement of a second perforated wall of screen 60 (FIG. 4) facilitates greater distribution of the finer granular material onto the bottom wall 28 of the trough. This second screen serves to delay the finer granular material and spread it out more uniformly over the area of the bed of coarse granular material moving downwardly on the bottom wall 28 of the trough. When the finer granular material flows through the screen 60 it is then brought into more uniform contact with the coarser material.

Figure 5:
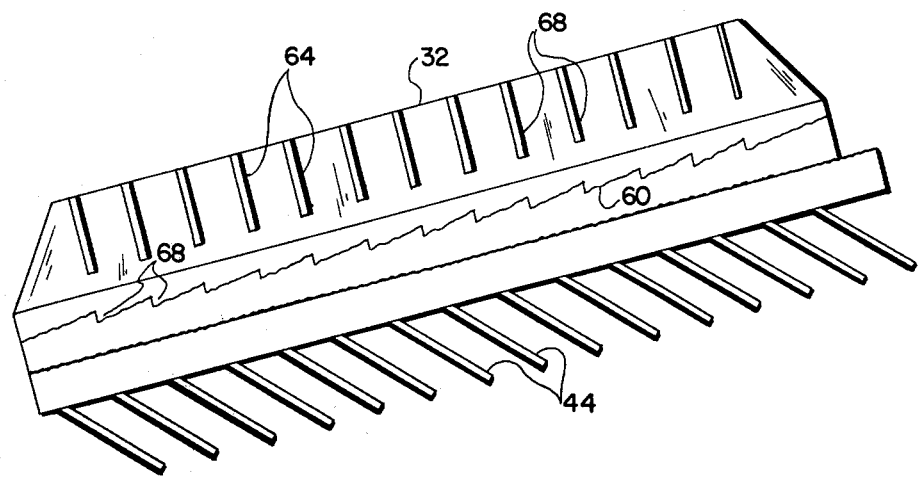
FIG. 5 is a side elevational, partially cross-sectional view of the embodiment of FIG. 4.

In order to further facilitate the movement upwardly and out the upper end of the drum 4 of the finer granular material, plates 64 (FIG. 4) are arranged on the slanting side walls of the trough 24 to inhibit movement downwardly along the cylindrical axis of the drum of the finer granular material. These plates 64 are arranged in series along the length of the slanted walls 32, with the planes of the plate being generally perpendicular to the cylindrical axis of the drum 4. Further provision for impeding downward movement of the finer granular material is provision of pockets 68 in the second screen 60 as shown in FIG. 5. These pockets 68 are formed simply by providing undulations in the screen 60 which then act as barriers to prevent the finer granular material from sliding downwardly on the top of the screen 60.

Figure 6:
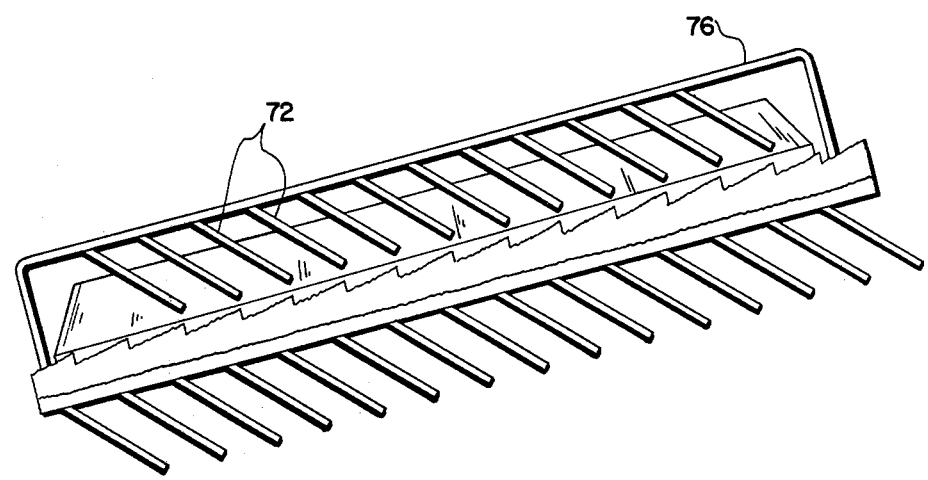
FIG. 6 is a side elevational, partially cross-sectional view of still another embodiment of the present invention.

Finally, still another feature which would facilitate movement upwardly of the finer granular material is the provision of a plurality of vanes 72 positioned above the trough (see FIG. 6). These vanes are slanted generally in the same manner as are the vanes 44 positioned below the trough. The vanes 72 are held in place by a support brace 76 which is mounted on the trough. Alternatively, the vanes 72 could be suspended independently of the trough. The vanes 72 serve to guide or move toward the upper end of the drum the finer granular material falling from the blades 12.

With the arrangement shown in the drawings, the rate at which one material is moved with respect to the other can be readily varied by simply varying the slope or length of the vanes 44. That is, if the vanes are shortened or the angle between the vanes and the trough 24 is increased, the rate of advance uphill of the finer granular material is reduced. Conversely, if the vanes are increased in length or the angle between the vanes and the trough is decreased, then the rate of uphill advance of the finer granular material is increased. The rate of advance of the material affects the amount of heat exchange between the two materials and thus this amount of heat exchange can be controlled.

It is to be understood that the above-described arrangements are only illustrative of the application of the principles of the present invention. Numerous other modifications and alternative arrangements may be devised by those skilled in the art without departing from the spirit and scope of the present invention and the appended claims are intended to cover such modifications and arrangements.

What is claimed is:

1. A method of transferring heat from one granular material to another comprising introducing onto one end of an elongate trough a first granular material composed of particles of generally a first size and being of a certain temperature, said trough including a bottom wall having a plurality of perforations therein of a size generally smaller than said first size, said trough being disposed within a rotatable, generally cylindrical drum at an angle with respect to the horizontal, said first granular material being introduced onto the trough at the upper end thereof, introducing into the end of the drum opposite said one end of the trough a second granular material composed of particles generally of a second size smaller than the size of the apertures and being of a temperature different from said certain temperature, rotating said drum to carry the second granular material from the bottom of the drum toward the top thereof in a carrying structure attached to the interior wall of the drum, said second material falling from said carrying structure onto the trough as the carrying structure rotates to near the top of the drum, and agitating said trough to cause the first granular material to move downwardly therealong to mix with the second granular material and to cause the second granular material to sift through the perforations in the trough, the first and second granular material thereby contacting one another to allow transfer of heat therebetween.

2. Counterflow heat exchange apparatus for solids comprising:

a generally cylindrical drum rotatable about the cylindrical axis thereof, said drum being oriented so that said axis is positioned at an acute angle with the horizontal or at the horizontal, means mounted in said drum for carrying material from the bottom of the drum to near the top thereof as the drum is rotated, such material falling from said carrying means as the material is rotated to near the top, elongate means disposed within said drum to extend from near a first end of said drum downwardly at an angle with respect to the horizontal to near the other end of said drum, said elongate means having a bottom formed with a plurality of apertures therein, vane means positioned either above or underneath said elongate means or both to guide material falling either from said carrying means or through said apertures toward said first end and out of the drum, means for introducing into said elongate means near said first end of the drum a first granular material whose particles are generally of a size too large to pass through said apertures, means for introducing into the other end of said drum a second granular material whose particles are generally of a size small enough to enable passage thereof through said apertures, means for rotating said drum so that said second material is carried upwardly in the drum by the carrying means to then fall therefrom onto said elongate means, and means for causing said elongate means to vibrate so that said first material is caused to move downwardly in the elongate means to mix with said second material and said second material is caused to pass through the apertures in the elongate means.

3. Apparatus as in claim 2 wherein said carrying means comprises a plurality of blades mounted on the interior surface of the drum wall to extend generally inwardly thereof.

4. Apparatus as in claim 2 wherein said carrying means comprises a plurality of generally annular plates attached at their perimeters to the interior wall of said drum in a spaced-apart relationship, the planes of said plates being generally perpendicular to the axis of said drum and a plurality of blades disposed to extend between the plates and from the interior wall of said drum inwardly thereof.

5. Apparatus as in claim 2 further including a strainer means disposed above said elongate means for intercepting said second material as it falls from said carrying means, said strainer means including apertures of sufficient size to allow the particles of the second material to pass therethrough.

6. Apparatus as in claim 5 wherein said strainer means is formed with barriers on the top side thereof to inhibit movement of the second material along the top of the strainer means toward the other end of said drum.

7. Apparatus as in claim 6 wherein said bottom wall is formed of a metal plate with openings therein.

8. Apparatus as in claim 2 wherein said elongate means includes an elongate bottom wall in which said apertures are located, and side walls which flare upwardly and outwardly of the bottom wall to guide material falling from said carrying means onto said bottom wall.

9. Apparatus as in claim 8 further including a strainer means extending between the side walls of said elongate means above said bottom wall to intercept said second material as it falls from said carrying means, said strainer means including apertures of sufficient size to allow the particles of the second material to pass therethrough.

10. Apparatus as in claim 8 wherein said elongate means further includes a plurality of guides upstanding from the upper surface of said side walls to prevent the flow of material toward the other end of said drum while allowing material to move toward said bottom wall.

11. Apparatus as in claim 8 wherein said bottom wall is formed of a screen material.

12. Apparatus as in claim 2 wherein said vane means comprises a plurality of plates spaced apart under said elongate means to extend from the underneath side of said elongate means downwardly and toward said first end of the drum, the planes of said plates being generally parallel, and one or more of said plates extending out of said drum at the first end to deliver out of the drum second material falling through the apertures of said elongate means.

13. Apparatus as in claim 12 wherein said vane means further comprises a plurality of blades spaced apart above said elongate means to extend downwardly and toward said first end of the drum to thereby guide material falling from said carrying means toward said first end of the drum.

14. Apparatus as in claim 2 further including a helical blade mounted within said drum at the other end thereof with the outer rim of said blade being attached to the interior wall of said drum so that second material introduced into said other end of the drum is carried a distance toward the first end of the drum to the carrying means.

* * * * *